US006261177B1

(12) United States Patent
Bennett

(10) Patent No.: US 6,261,177 B1

(45) **Date of Patent: *Jul. 17, 2001**

(54) SLOT MACHINE GAME-HIDDEN OBJECT

(75) Inventor: Nicholas Bennett, Manly Vale (AU)

(73) Assignee: Aristocrat Technologies Australia Pty Ltd., New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/254,164

(22) PCT Filed: Aug. 28, 1997

(86) PCT No.: PCT/AU97/00553

§ 371 Date: Mar. 1, 1999

§ 102(e) Date: Mar. 1, 1999

(87) PCT Pub. No.: WO98/09258

PCT Pub. Date: Mar. 5, 1998

(30) Foreign Application Priority Data

Aug. 28, 1996 (AU) .................................................. PO1943

(51) Int. Cl.[7] ..................................................... A63F 13/00

(52) U.S. Cl. .......................... 463/16; 463/20; 273/137 R

(58) Field of Search .................. 463/20, 16; 273/143 R, 273/237, 434

(56) References Cited

U.S. PATENT DOCUMENTS

| | | | | |
|---|---|---|---|---|
| 4,856,787 | * | 8/1989 | Itkis | 273/237 |
| 5,342,047 | * | 8/1994 | Heidel et al. | 273/85 |
| 5,411,271 | * | 5/1995 | Mirando | 273/434 |
| 6,015,346 | * | 2/2000 | Bennett | 463/20 |
| 6,102,798 | * | 8/2000 | Bennett | 463/16 |

FOREIGN PATENT DOCUMENTS

| | | | |
|---|---|---|---|
| 1553117 | | 6/1976 | (GB) . |
| 2065948 | | 12/1980 | (GB) . |
| 2084371 | | 9/1981 | (GB) . |
| 2137392 | | 2/1983 | (GB) . |
| 2251112 | | 10/1990 | (GB) . |
| 2252705 | * | 12/1990 | (GB) . |
| 2296360 | | 12/1995 | (GB) . |

* cited by examiner

*Primary Examiner*—Joe H. Cheng
*Assistant Examiner*—Kathleen M. Christman
(74) *Attorney, Agent, or Firm*—Rosenman & Colin, LLP

(57) ABSTRACT

A slot machine includes a prize display, a coin entry slot, and payout tray and internally mounted game control processor circuits. The game display means comprises a video display screen controlled to display a game image divided into a matrix of elements or player selectable zones. The video screen has an array of touch sensitive areas located on its display surface with one such area associated with each matrix element. The control processor causes an image to be displayed on the display means, such as a sportsman playing his sport and randomly selects one or more of the matrix elements to have a prize associated with it. The player selects one of the matrix elements to have a prize by touching the screen within the area of the respective element to be selected, thereby causing the image in the element to change to reveal the associated prize value. Additional player controls are implemented by displaying images corresponding to controls on the screen such that when the control images are touched, the associated function is caused to be performed. In the event that the player wins the game, by selecting a zone having associated prize value, the machine will pay him a prize equivalent to the prize value in the zone selected by the player multiplied by the number of units bet, if appropriate.

23 Claims, 6 Drawing Sheets

SLOT MACHINE GAME-HIDDEN OBJECT

INTRODUCTION

The present invention relates to gaming machines of the type generally referred to as slot machines, fruit machines or poker machines, and in particular the invention provides a new game played on such a machine.

Players who regularly play gaming machines quickly tire of particular games and therefore it is necessary for manufacturers of these machines to come up with innovative games or game features that add interest to the games provided on such machines in order to keep the players amused and therefore willing to continue playing the game.

DESCRIPTION OF THE PRIOR ART

Gaming or poker machines have been well known in the state of New South Wales for many years and have more recently gained considerable popularity throughout Australia, with quite substantial amounts of money wagered on these machines. There is a growing tendency for State governments to legalise the use of gaming machines by licensing operators, with resulting revenue gains through licence fees and taxation of monies invested. The licensed operation of gaming machines is the subject of State legislation and regulation. This regulation almost always dictates a minimum percentage payout for a gaming machine. For example, a minimum of 85% of monies invested must be returned as winnings, and manufacturers of gaming machines therefore must design their machines around these regulatory controls.

With the growth that has occurred in the gaming machine market there is intense competition between manufacturers to supply the various existing and new venues. When selecting a supplier of gaming machines, the operator of a venue will often pay close attention to the popularity of various games with their patrons.

Therefore, gaming machine manufacturers are keen to devise games which are popular with players, as a mechanism for improving sales.

In particular, manufacturers regularly devise new games which have not previously been seen on slot machines in order to stimulate renewal of player interest.

SUMMARY OF THE INVENTION

A slot machine including display means arranged to display a game being played on the machine, game initiating means to initiate a game on the machine and game control means responsive to the initiating means to control the playing of the game, characterised in that the display means is arranged to display:

- a game image having a plurality of player selectable zones, the control means including player zone selection means, a prize being associated with at least one of the zones, and at least one of the zones being randomly selected by the control means to be a winning zone, selection of which by the player causes a related prize to be awarded to the player.

The game image may either be a static image or a dynamic (ie video) image, depending upon the particular embodiment of the invention.

In one embodiment, clues are provided to assist the player in determining the probability of a particular zone being the winning zone.

Some embodiments of the invention will include some zones which have a zero prize value such that if randomly selected by the controller and selected by the player, no prize is awarded to the player.

Preferably, the zone selection means includes touch sensors associated with the display means such that touching the display means within the area of one of the player selectable zones causes the respective zone to be selected. Preferably, the display means is a video screen or LCD panel and touch sensors are touch switches associated with zones of the display.

In preferred embodiments, the game image may display a sportsman playing his sport or a scene covering a hidden target. Examples include a golfer teeing off, a soccer player kicking a ball, a rugby player passing a ball, an angler casting his fly or a battleship dropping a depth charge or firing missiles. The player wins the game by selecting a zone in the display in which the sportsman's ball or fly lands, or the location of a hidden submarine hit by the ship's depth charge or missiles.

BRIEF DESCRIPTION OF THE DRAWINGS

Embodiments of the present invention will now be described by way of example with reference to the accompanying drawings in which.

DETAILED DESCRIPTION OF THE PREFERRED EMBODIMENTS

In the following detailed description, the methodology of the embodiments will be described and it is to be understood that it is within the capabilities of the non-inventive worker in the art to introduce the methodology on any standard microprocessor based gaming machine by means of appropriate programming.

Figure 1:
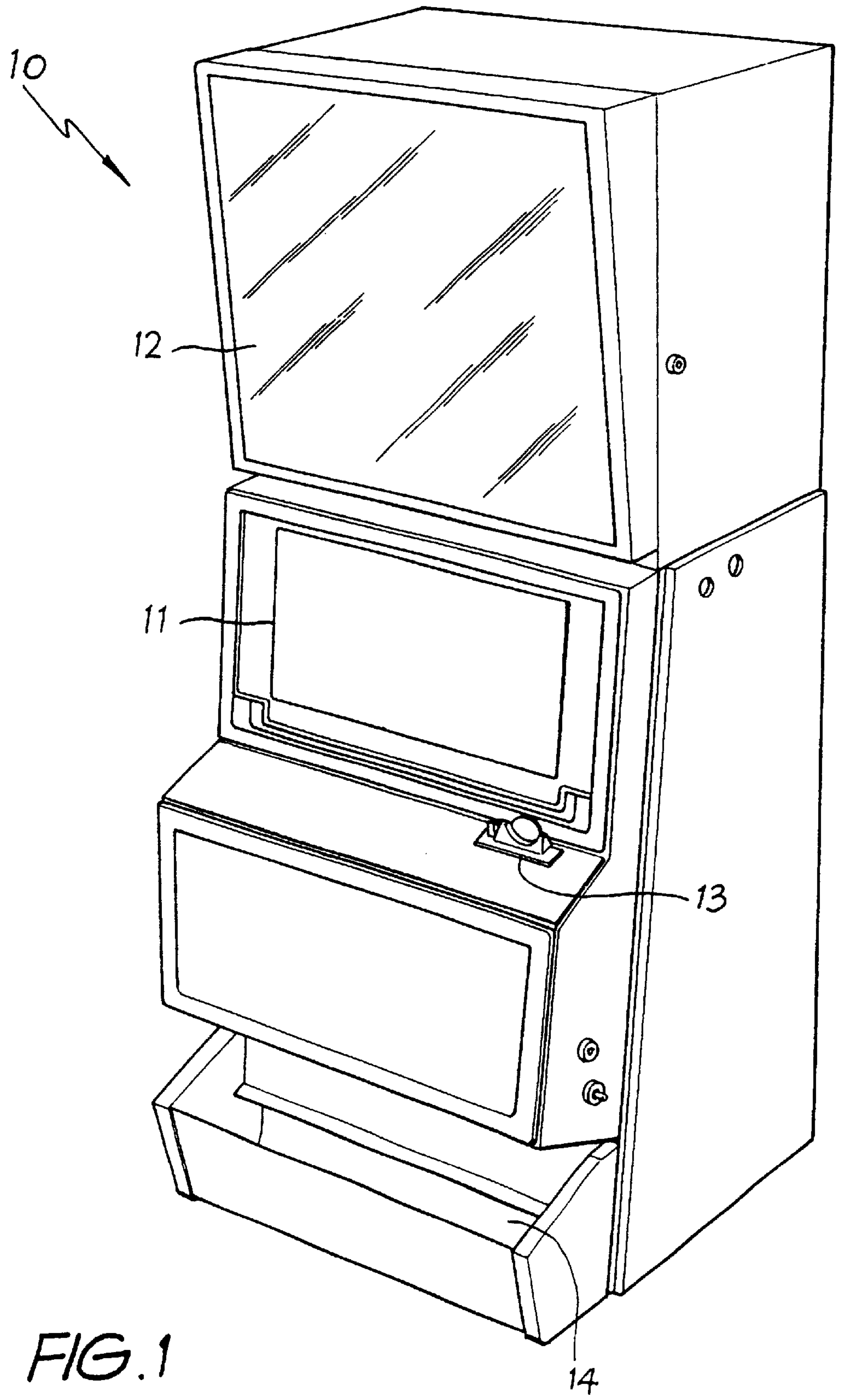
FIG. 1 illustrates a touch screen slot machine incorporating the present invention.
Figure 6:
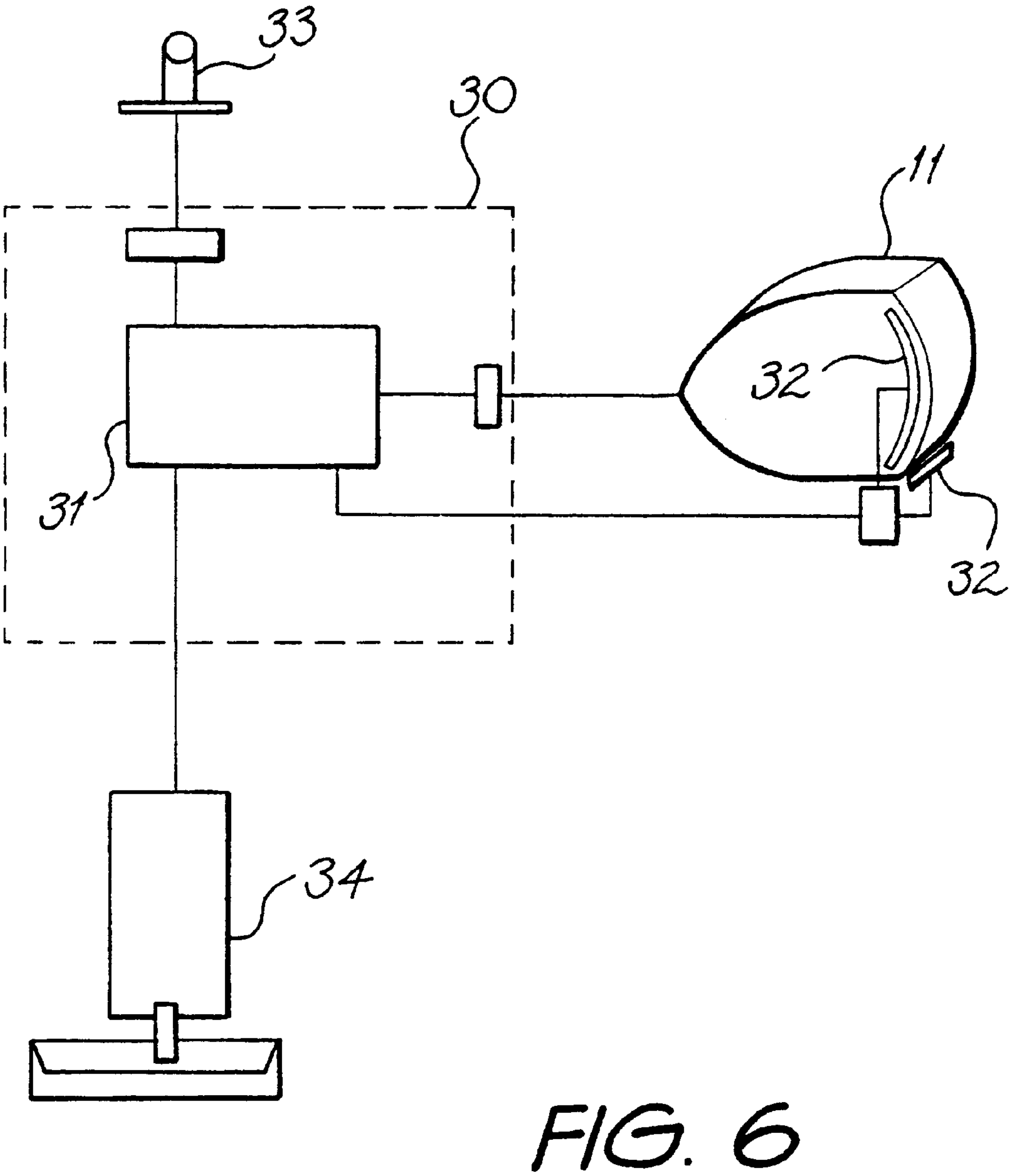
FIG. 6 is a schematic diagram of a slot machine control circuit.

Referring to FIG. 1, the illustrated embodiment of the invention is housed in a conventional slot machine cabinet 10 including a prize display 12, a coin entry slot 13, a payout tray 14 and internally mounted game control processor circuits (refer to FIG. 6).

Preferably, the game display means 11 comprises a video display screen 11 controlled to display a game image divided into a matrix of elements or player selectable zones. The video screen is preferably of the touch sensitive variety, having an array of touch sensitive areas located on its display surface with one such area associated with each matrix element 40–54 (refer to FIG. 2). The player selects one of the matrix elements (eg. 41 and 48) by touching the screen within the area of the respective element to be selected, thereby causing the image in the element to change to reveal the associated prize value (refer to 41 and 48 in FIG. 3). Additional player controls may be implemented by displaying images 18, 19, 20, 21, 22, 23, corresponding to controls on the screen such that when the control images are touched, the associated function is caused to be performed.

Figure 2:
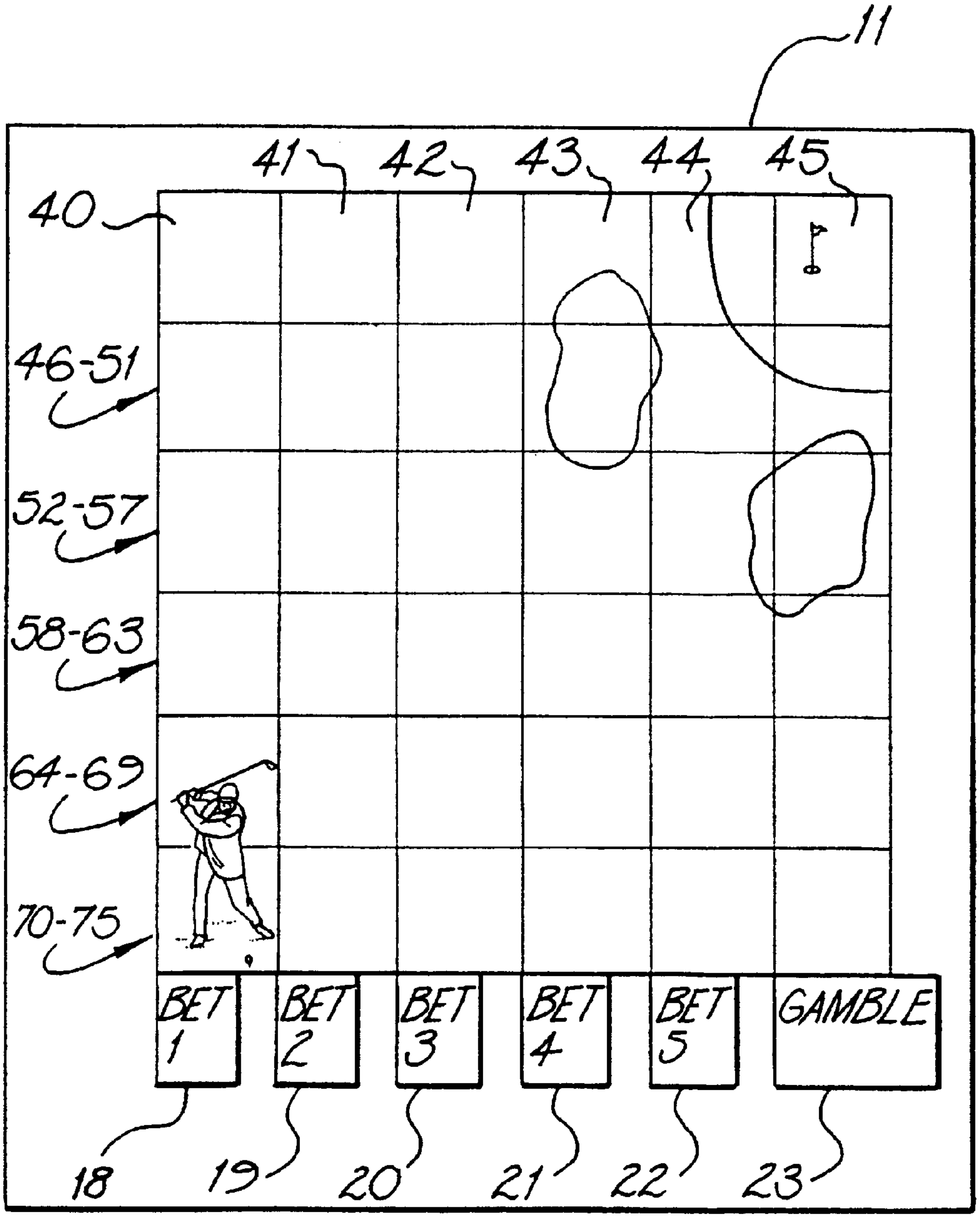
FIG. 2 illustrates a screen layout for an embodiment of the invention.

Referring to FIG. 2, a screen layout is illustrated for a first embodiment of the invention. In this embodiment, one such player control is a gamble button 23. which when touched causes a game to be initiated. Additionally, buttons 18, 19, 20, 21 and 22 enable bets of 1–5 credits to be placed on each game. The player first touches the gamble button 23 which causes the game to commence and an image into a matrix of image elements 40–75 to be displayed.

Once the image is displayed, the player may select his bet which will be deducted from his available credit (and will cause the prize to be multiplied by the number of bet units selected). In some embodiments bet selection may not be provided and all bets will be of one unit.

After the player has selected his bet using buttons 18–22 he may select an image element by touching the appropriate screen position (eg. 49).

Figure 3:
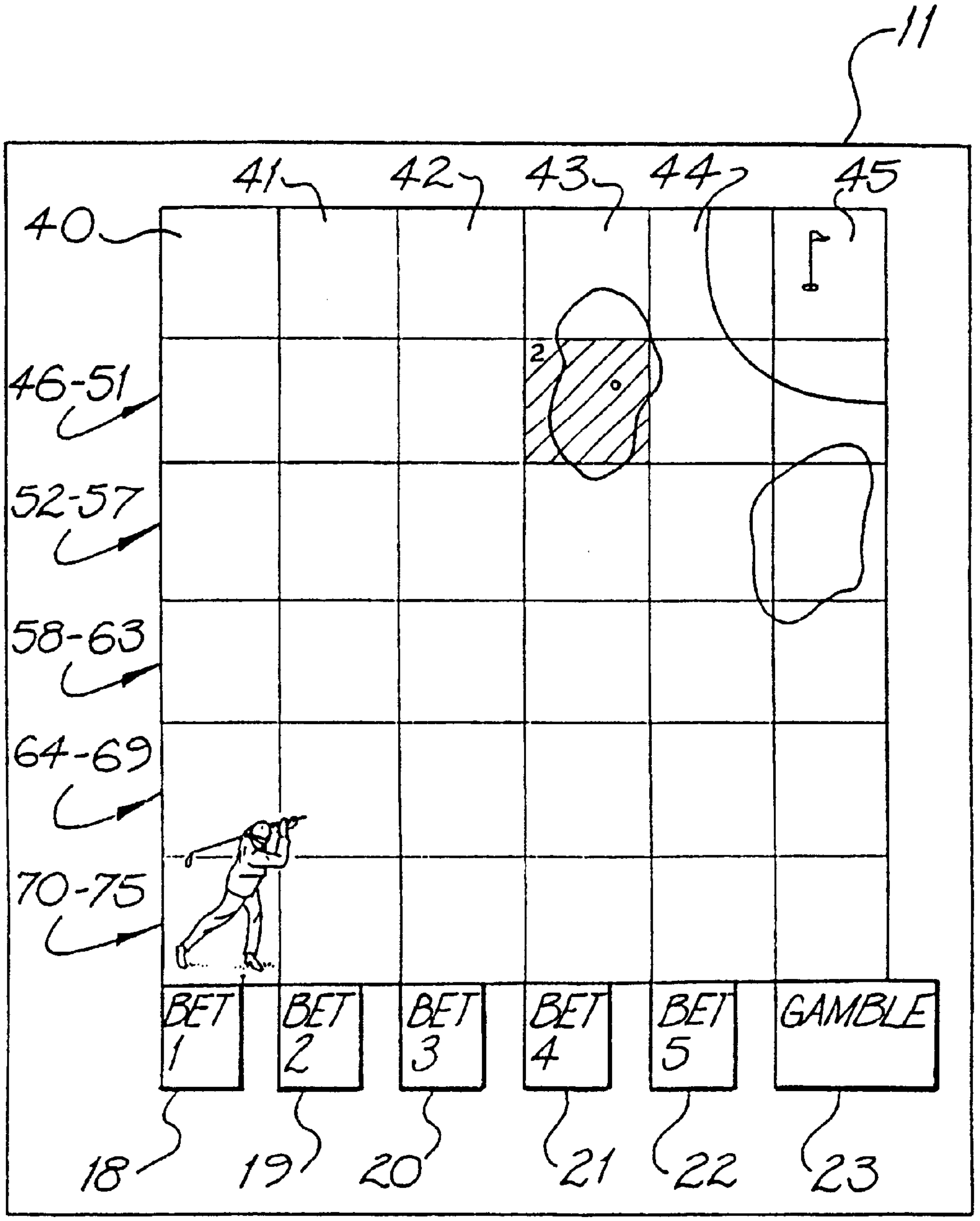
FIG. 3 illustrates the screen layout of FIG. 2 after a winning zone has been selected.
Figure 4:
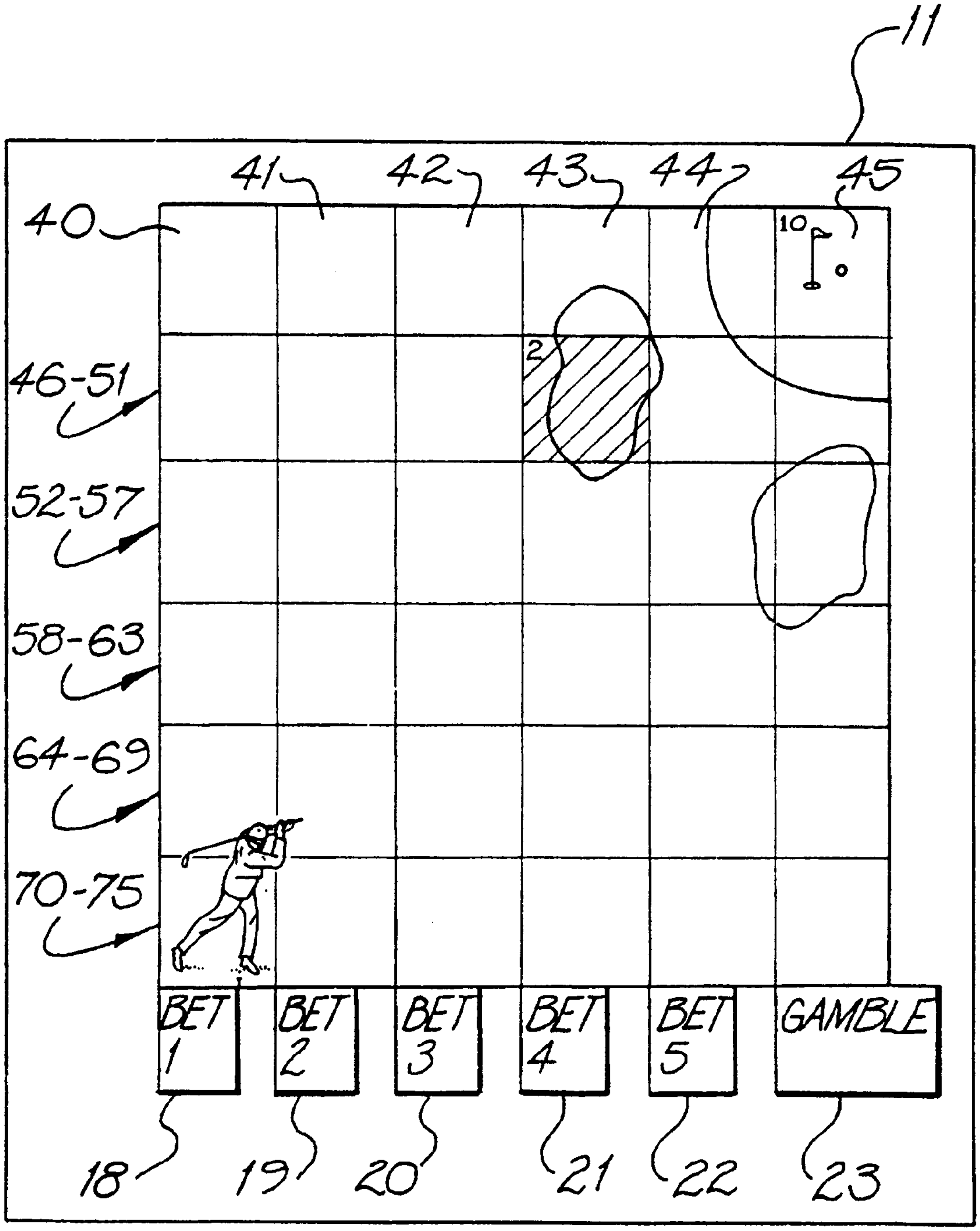
FIG. 4 illustrates the screen layout of FIG. 2 after a non-winning zone has been selected.

Referring to FIGS. 3 and 4, as the player selects an image element. the associated prize indica will be displayed (2 units in the case of zone 49) to reveal a prize value and simultaneously the winning zone will be displayed (zone 49 in FIG. 3 and zone 45 in FIG. 4) and in the event that the winning zone and the player selected zone are identical (eg as in FIG. 3) or one of the zones reveals a wild symbol, a prize is awarded to the player. The prize will be the value revealed (2 in the case of zone 49) multiplied by the number of units bet, if appropriate.

Figure 5:
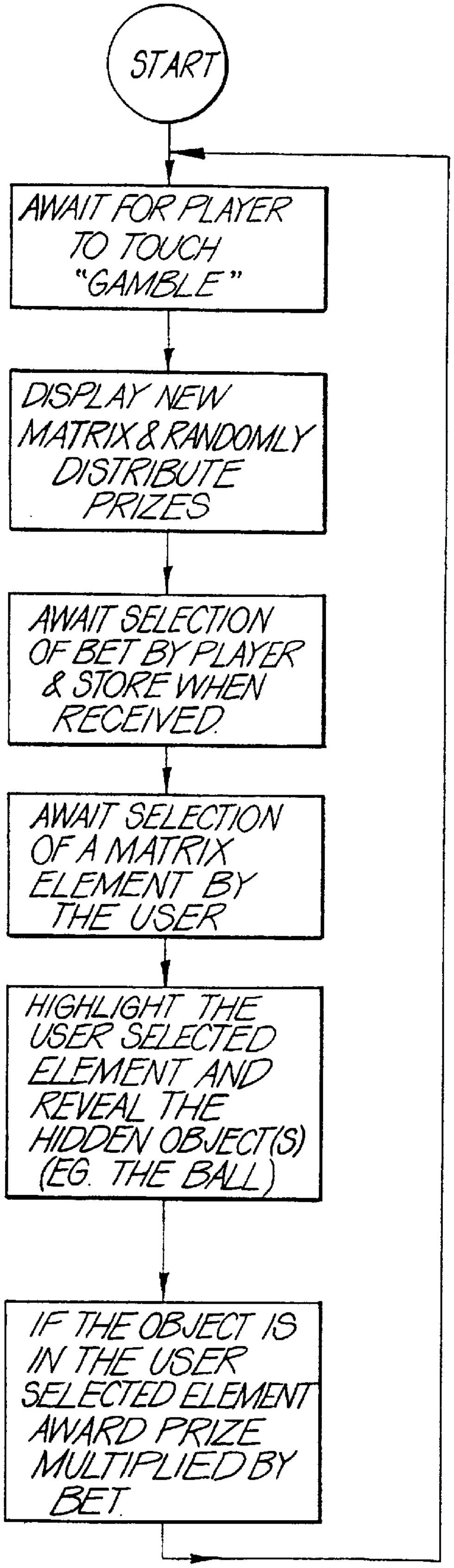
FIG. 5 is a flow chart showing operation of the game described with reference to FIG. 2.

Referring to FIG. 5, a flow diagram is illustrated to show the logic of a control program which controls the operation of the game. From this diagram it will noted that, after starting, the machine awaits the touching of the gamble button 23 to commence the game. The control program then causes the display of an image comprising a matrix of image elements and randomly associates prizes with each displayed indicia. The game image may be the same for each game or may be a variation on the same theme with different backgrounds and orientations of characters etc, for example, if the image is of a golfer, each game may represent a different hole of a course, a different location on a given hole, or a different golf course.

The display might also indicate information relating to the image such as the golfers capability with various clubs and the player may in some embodiments control the game by for example selecting the club to be used by the golfer using the auxiliary controls.

The program to implement the sequence of FIG. 4 runs on a standard gaming machine control processor 31 as illustrated schematically in FIG. 6. This processor forms part of a controller 30 which drives the display screen 11 and receives touch input signals from touch sensors 32 as well as receiving coin input pulses from a coin chute mechanism 33 and driving a coin payout mechanism 34.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A slot machine including display means arranged to display a game being played on the machine, game initiating means to initiate a game on the machine and game control means responsive to the initiating means to control the playing of the game, characterized in that the display means is arranged to display a game image having a plurality of player selectable zones, the control means including player zone selection means, a prize being associated with at least one of the zones, and at least one of the zones being randomly selected by the control means to be a winning zone, selection of which by the player causes a related prize to be awarded to the player.

2. The slot machine of claim 1 wherein the game image is a static image.

3. The slot machine of claim 1 wherein the game image is a dynamic image.

4. The slot machine of claim 1, wherein clues are provided to assist the player in determining the probability of a particular zone being the winning zone.

5. The slot machine of claim 1, wherein the game includes one or more zones which have a zone prize value such that if randomly selected by the controller and selected by the player, no prize is awarded to the player.

6. The slot machine of claim 1, wherein the zone selection means includes touch sensors associated with the display means such that touching the display means within the area of one of the player selectable zones causes the respective zone to be selected.

7. The slot machine of claim 1, wherein the display means is a video screen.

8. The slot machine of claim 1, wherein the display means is an LCD panel.

9. The slot machine of claim 1, wherein the zone selection means is a set of touch switches associated with zones of the display.

10. The slot machine of claim 1, wherein the game image displays a sportsman playing his sport.

11. The slot machine as claimed in claim 10, wherein the game image displays a golfer teeing off his golf ball.

12. The slot machine as claimed in claim 10 wherein the game image displays a soccer player kicking a ball.

13. The slot machine as claimed in claim 10 wherein the game image displays a rugby player passing a ball.

14. The slot machine as claimed in claim 11, wherein the game is won by the player selecting a zone in the display in which the golf has landed.

15. The slot machine as claimed in claim 10, wherein the game image display an angler casting a fly.

16. The slot machine as claimed in claim 15, wherein the game is won by the player selecting a zone in the display in which the fly has landed.

17. The slot machine of claim 1, wherein the game image displays a scene covering a hidden target.

18. The slot machine as claimed in claim 17, wherein the game image displays a battleship dropping a depth charge and hitting the hidden target.

19. The slot machine as claimed in claim 18, wherein the hidden target is a submarine and the game is won by the player selecting a zone in the display containing the location of the submarine hit by the ship's depth charge.

20. The slot machine as claimed in claim 17, wherein the game image displays a battleship firing missiles and hitting the hidden target.

21. The slot machine as claimed in claim 20, wherein the hidden target is a submarine and the game is won by the player selecting a zone in the display containing the location of the submarine hit by the ship's missiles.

22. The slot machine as claimed in claim 12, wherein the game is won by the player selecting a zone in the display in which the ball has landed.

23. The slot machine as claimed in claim 13, wherein the game is won by the player selecting a zone in the display in which the ball has landed.

* * * * *